(12) United States Patent
Dake et al.

(10) Patent No.: US 12,481,297 B2
(45) Date of Patent: Nov. 25, 2025

(54) SHIP DOCKING ASSISTANCE DEVICE

(71) Applicant: Yanmar Power Technology Co., Ltd., Osaka (JP)

(72) Inventors: Yuichiro Dake, Osaka (JP); Naohiro Hara, Osaka (JP); Tomoya Fukukawa, Osaka (JP); Isao Wakabayashi, Osaka (JP); Toshiyuki Yokoue, Osaka (JP)

(73) Assignee: YANMAR POWER TECHNOLOGY CO., LTD., Osaka (JP)

( * ) Notice: Subject to any disclaimer, the term of this patent is extended or adjusted under 35 U.S.C. 154(b) by 272 days.

(21) Appl. No.: 17/773,481

(22) PCT Filed: Oct. 21, 2020

(86) PCT No.: PCT/JP2020/039603
§ 371 (c)(1),
(2) Date: Apr. 29, 2022

(87) PCT Pub. No.: WO2021/085274
PCT Pub. Date: May 6, 2021

(65) Prior Publication Data
US 2024/0184311 A1    Jun. 6, 2024

(30) Foreign Application Priority Data
Oct. 29, 2019 (JP) .................. 2019-196693

(51) Int. Cl.
G05D 1/661 (2024.01)
G05D 1/246 (2024.01)
G05D 1/248 (2024.01)

(52) U.S. Cl.
CPC .......... *G05D 1/661* (2024.01); *G05D 1/2462* (2024.01); *G05D 1/248* (2024.01)

(58) Field of Classification Search
CPC ...... G05D 1/661; G05D 1/2462; G05D 1/248; B63B 49/00; B63B 79/15; G01C 21/203;
(Continued)

(56) References Cited

U.S. PATENT DOCUMENTS 3,870,992 A * 3/1975 Hanna, Jr. ............... G01S 7/28
                                                        342/41
9,354,343 B2 * 5/2016 Roberts .................... G01V 1/38
(Continued)

FOREIGN PATENT DOCUMENTS

AU    2007287418 A1 *  2/2008  ............... G06T 7/35
JP        5431141 B2     3/2014
(Continued)

OTHER PUBLICATIONS

International Search Report dated Dec. 8, 2020 issued in corresponding PCT Application PCT/JP2020/039603.

*Primary Examiner* — Hunter B Lonsberry
*Assistant Examiner* — Henry R Hinton
(74) *Attorney, Agent, or Firm* — NORTON ROSE FULBRIGHT US LLP

(57) ABSTRACT

A ship docking assistance device includes a position azimuth information acquisition unit; a LIDAR; a map generation updating unit; a high-point acquisition unit; and a position azimuth estimation unit. The LIDAR acquires point-group data three-dimensionally indicating the environment around a ship. The map generation updating unit generates a map around the ship based on the point-group data. The high-point acquisition unit acquires, from within the point-group data, a high point having a prescribed height or more. The position azimuth estimation unit estimates the position and the azimuth of the ship through matching between the position of the high point acquired by the high-point acquisition unit and the position of the high point in the map. The map generation updating unit updates the map by placing the (Continued)

point-group data in the map using, as references, the position and the azimuth of the ship estimated by the position azimuth estimation unit.

16 Claims, 6 Drawing Sheets

(58) Field of Classification Search
CPC .. G01C 21/3811; G01C 21/3848; G08G 3/00; G09B 29/006; B63H 2020/003
See application file for complete search history.

(56) References Cited

U.S. PATENT DOCUMENTS

| | | | |
|---|---|---|---|
| 10,209,081 B2* | 2/2019 | Ghadiok | G01C 21/28 |
| 11,313,976 B2* | 4/2022 | Otaki | G01S 19/47 |
| 11,609,574 B2* | 3/2023 | Walters | G05D 1/0206 |
| 2014/0063232 A1* | 3/2014 | Fairfield | G06V 20/58 |
| | | | 382/104 |
| 2019/0251356 A1* | 8/2019 | Rivers | G01C 21/203 |
| 2019/0361457 A1* | 11/2019 | Johnson | G05D 1/0044 |
| 2020/0249356 A1* | 8/2020 | Huang | G05D 1/0231 |
| 2023/0334850 A1* | 10/2023 | Harvey | G06T 17/005 |
| 2024/0077883 A1* | 3/2024 | Bertucci | A01B 79/005 |

FOREIGN PATENT DOCUMENTS

| | | |
|---|---|---|
| JP | 2018-081008 A | 5/2018 |
| JP | 2018-139084 A | 9/2018 |
| WO | 2019/130945 A1 | 7/2019 |

* cited by examiner

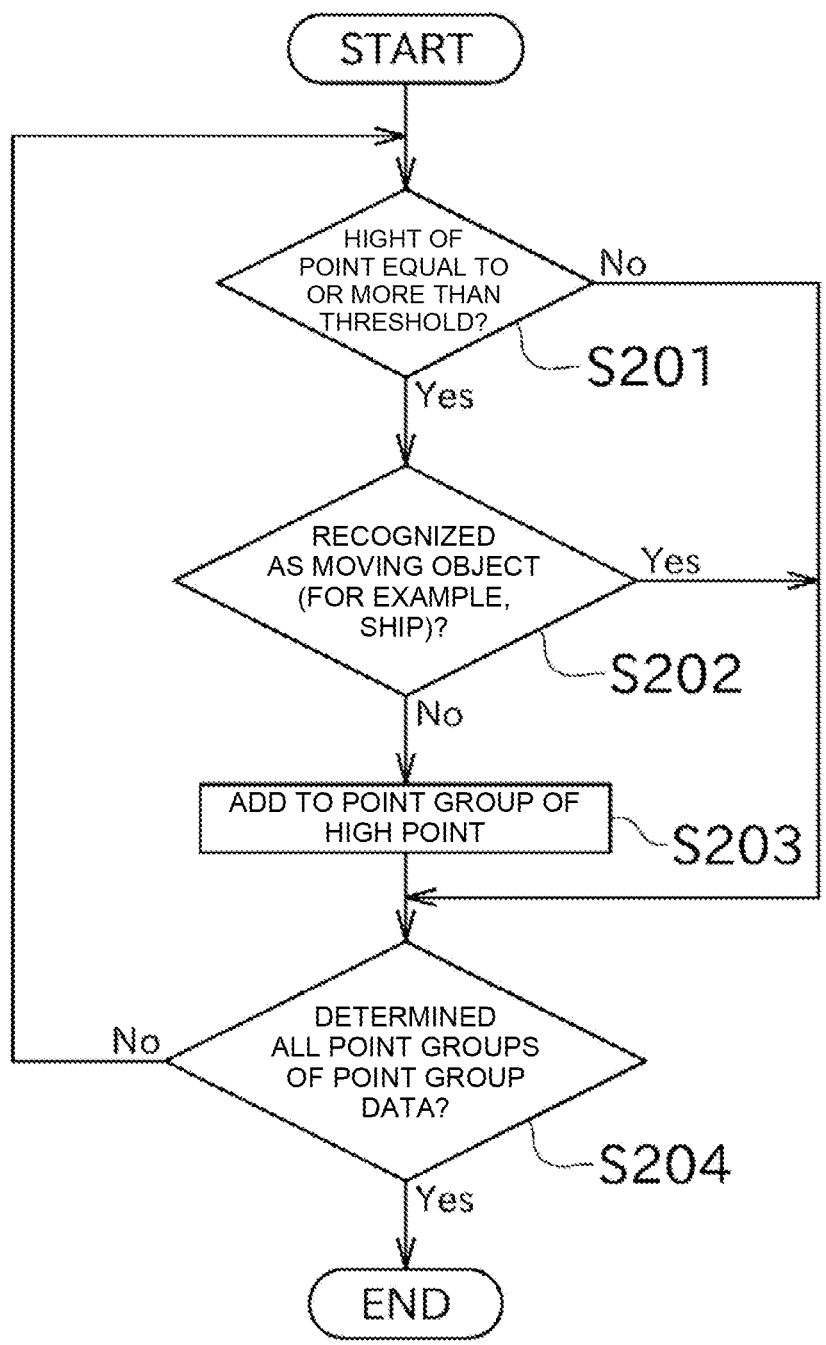

SHIP DOCKING ASSISTANCE DEVICE

CROSS-REFERENCE TO RELATED APPLICATIONS

This application is a national stage application pursuant to 35 U.S.C. § 371 of International Application No. PCT/JP2020/039603, filed on Oct. 21, 2020 which claims priority under 35 U.S.C. § 119 to Japanese Patent Application No. 2019-196693 filed on Oct. 29, 2019, the disclosures of which are hereby incorporated by reference in their entireties.

TECHNICAL FIELD

The present invention relates to a ship docking assistance device.

BACKGROUND ART

Conventionally, it is known that a ship docking assistance device acquires the ship's position data based on a satellite positioning system in order for the ship to dock. Patent Literature 1 discloses this type of ship docking assistance device.

The ship docking assistance device in Patent Literature 1 has a GPS mounted to the ship. This ship docking assistance device can calculate the ship's own position from the GPS. The ship docking assistance device of Patent Literature 1 inputs, to a signal processing unit, a position signal by the latitude and longitude output from the GPS. The position signal by the GPS, the signal output from a millimeter wave radar, and the chart data input to the signal processing unit in advance are used to determine the positional relation between the ship and the wharf or dock.

CITATION LIST

Patent Literature

Patent Literature 1: Japanese Patent No. 5431141

DISCLOSURE OF INVENTION

Problems to be Solved by the Invention

For calculating the ship's own position, the ship docking assistance device in Patent Literature 1 uses the GPS, a type of GNSS. However, the ship's own position calculated by the GPS alone often has a certain great error relative to the ship's actual own position. Therefore, it was difficult to accurately acquire the positional relation between the ship and the wharf or dock. As a result, for example, when attempting to automatically dock the ship at the wharf or the like using the ship's own position, it may not be possible to properly dock the ship at a target docking position.

The present invention has been made in view of the above circumstances, and it is an object of the present invention to provide a ship docking assistance device that can accurately acquire the position of a ship.

Means for Solving the Problems

The problem to be solved by the present invention is as described above, and next, the means for solving this problem and an effect thereof will be described.

According to an aspect of the present invention, a ship docking assistance device having the following configuration is provided. That is, this ship docking assistance device includes a position acquisition unit, a surrounding environment sensor, a map generation unit, a landmark position acquisition unit, and an estimation unit. The position acquisition unit acquires a ship's position data that is based on a satellite positioning system. The surrounding environment sensor acquires surrounding environment data that shows an environment around the ship in three dimensions. The map generator generates a map around the ship based on the surrounding environment data. The landmark position acquisition unit acquires a position of a landmark that is, among the surrounding environment data, an object of a predetermined height or more. The estimation unit estimates the ship's position and azimuth by matching the landmark position acquired by the landmark position acquisition unit, with the landmark's position in the map. The map generation unit places the surrounding environment data on the map based on the ship's position and azimuth estimated by the estimation unit, thereby to update the map.

With this, the surrounding environment data is placed on the map based on the own ship's position and azimuth estimated as a result of matching the surrounding environment data with the map, thus making it possible to acquire the map with accuracy higher than when following the satellite positioning system. Further, since the matching is executed by excluding the object with low height, it is possible to prevent the object, that is unstable to detect (for example, dock), from degrading the accuracy of estimating the ship's position and azimuth. As a result, a map that is accurate can be acquired, thus making it possible to appropriately perform a docking assistance.

In the ship docking assistance device, the map generation unit places the surrounding environment data on the map regardless of whether the surrounding environment data corresponds to the landmark or not.

With this, regardless of whether the surrounding object is high or low, use of the map can prevent from physically contacting the object.

It is preferable that, in the ship docking assistance device, the following configuration is made. That is, the landmark position acquisition unit excludes, from a target to be acquired as the landmark's position, the surrounding environment data's portion that corresponds to a portion that is determined to be a moving object by image recognizing of an imaging result of a camera included in the ship.

With this, the accuracy of estimating the ship's position and azimuth can be prevented from being degraded by the matching that is based on the moving object.

It is preferable that, in the ship docking assistance device, the map generation unit excludes, from a target to be placed on the map, the surrounding environment data's portion having a distance from the ship closer than a predetermined distance.

This can prevent, for example, waves, which are caused by the movement of the ship, from being treated as obstacles.

It is preferable that, in the ship docking assistance device, when the estimation unit estimates the ship's position and azimuth, the ship's position data acquired by the position acquisition unit is input to the estimation unit.

This gives, to the estimation unit, a clue as to the ship's position, thus making it possible to estimate the ship's position and azimuth with a small calculation amount and in a short time.

It is preferable that, in the ship docking assistance device, the following configuration is made. That is, the ship docking assistance device includes an azimuth acquisition unit that acquires the ship's azimuth data. When the estimation unit estimates the ship's position and azimuth, the ship's position data acquired by the position acquisition unit and the ship's azimuth data acquired by the azimuth acquisition unit are input to the estimation unit.

This gives, to the estimation unit, the clue as to the ship's position and azimuth, thus making it possible to estimate the ship's position and azimuth with a smaller calculation amount and in a short time.

It is preferable that, in the ship docking assistance device, the following configuration is made. That is, the azimuth acquisition unit acquires the ship's azimuth data that is based on the satellite positioning system. The docking assistance device includes an azimuth change acquisition unit that acquires a relative change in the ship's azimuth. The ship's azimuth data acquired by the azimuth acquisition unit is corrected based on a result of acquiring, with the azimuth change acquisition unit, the relative change in the ship's azimuth from a time of acquiring the azimuth data to a time of acquiring the surrounding environment data, and thereafter the corrected azimuth data is input to the estimation unit.

This accomplishes that even when the time interval for the azimuth acquisition unit to acquire the azimuth that is based on the satellite positioning cannot be shortened, using the azimuth change acquisition unit makes it possible to give, in a sufficiently short time interval, to the estimation unit, the clue as to the ship's azimuth.

It is preferable that, in the ship docking assistance device, the following configuration is made. That is, the ship docking assistance device includes an attitude acquisition unit capable of acquiring the ship's attitude in at least a pitch direction and a roll direction. Based on the ship's attitude acquired by the attitude acquisition unit, the surrounding environment data is corrected so as to remove an influence of the ship's attitude.

This can remove the influence caused to the surrounding environment data due to the rocking of the ship. As a result, the matching and the surrounding environment data's placing can be accurately done, thus making it possible to acquire the map with high accuracy.

It is preferable that, in the ship docking assistance device, an automatic docking control of the ship is executed based on the map updated by the map generation unit.

This allows the automatic docking control to be executed based on the accurate map.

BRIEF DESCRIPTION OF DRAWINGS

FIG. 2 is a schematic diagram

FIG. 4 is a schematic diagram

FIG. 6 is a flowchart showing a process for extracting the high point.

DESCRIPTION OF EMBODIMENTS

Figure 1:
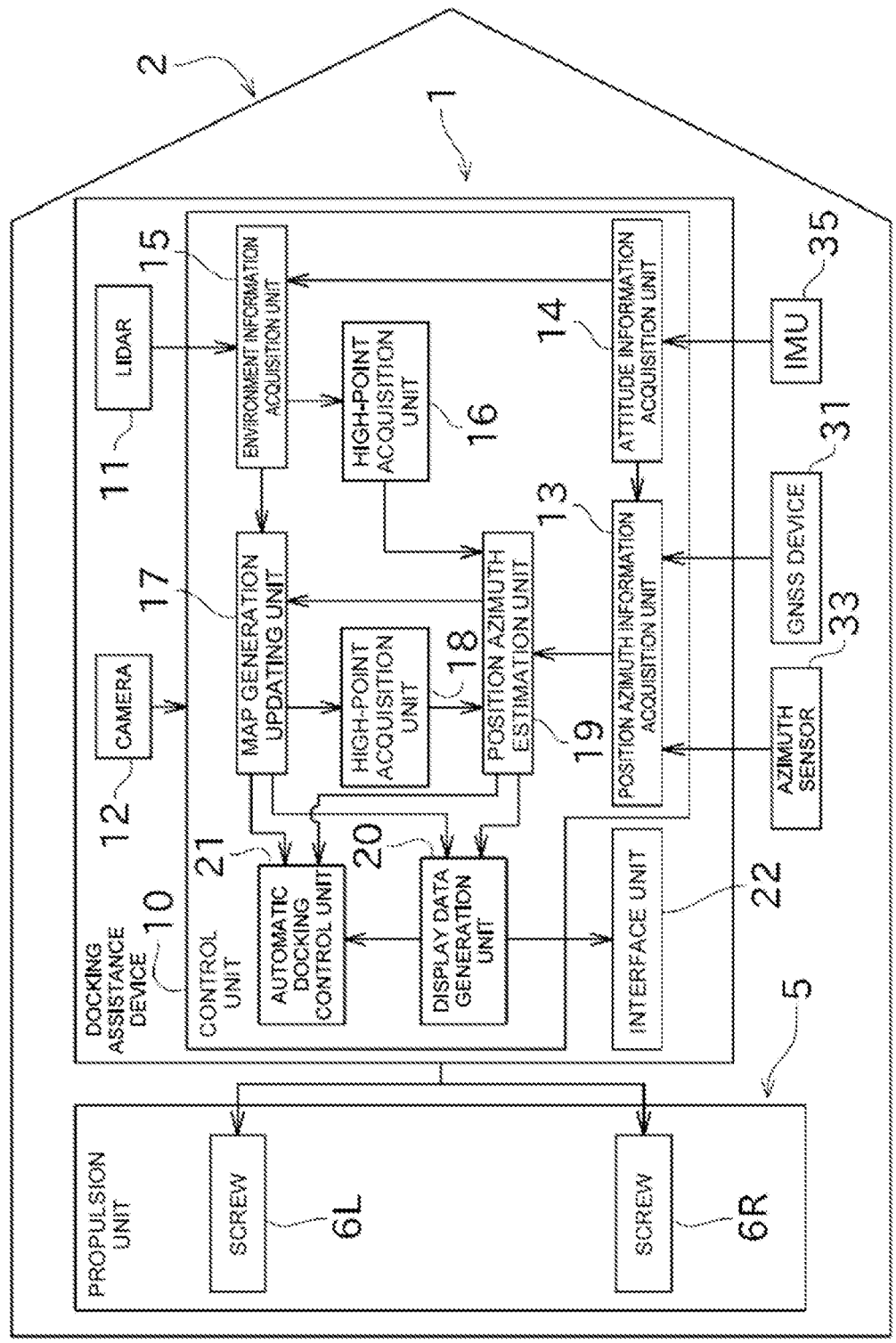
FIG. 1 is a block diagram showing an electrical configuration of a ship docking assistance device according to one embodiment of the present invention.

Then, embodiments of the present invention will be described referring to drawings. FIG. 1 shows a block diagram showing an electrical configuration of a docking assistance device 1 for a ship 2 according to one embodiment of the present invention.

The ship docking assistance device (hereinafter simply referred to as docking assistance device) 1 shown in FIG. 1 is used on board the ship 2. The term "docking" as used herein includes the case where the ship 2 is docking on a wharf, and the case where the ship 2 is docking on a structure such as a dock.

Configuration of the ship 2 to which the docking assistance device 1 is applied is not limited. For example, the ship 2 can be a pleasure boat, fishing ship, water-jet ship, electric propulsion ship, hybrid ship, etc.

The ship 2 includes a propulsion unit 5.

A propulsion unit 5 includes a pair of screws 6L, 6R. The screws 6L, 6R are placed on the left and right sides of the stern of the ship 2. The propulsion unit 5 can rotate the screws 6L, 6R by a driving force of a drive source (engine or electric motor). The direction of the rotation axis of each of the screws 6L, 6R can be changed around a vertical axis. The directions of the rotation axes, the stop/forward rotation/reverse rotation, and the rotation speed of the respective screws 6L, 6R can be changed independently of each other. Controlling the respective screws 6L, 6R can accomplish various ship maneuvers including the lateral parallel movement, the in-situ turning, etc. of the ship 2.

Further, the configuration of the propulsion unit 5 is not particularly limited. For example, the screws 6L, 6R can be configured as stern drives or outboard motor screws. In place of the screws 6L, 6R, a pair of left and right water jets that can change the direction and speed of water jetting independently of each other can be placed.

The docking assistance device 1 of the ship 2 has a control unit 10, a LIDAR (surrounding environment sensor) 11, and a camera 12. The control unit 10 includes a position azimuth information acquisition unit (position acquisition unit, azimuth acquisition unit) 13, an attitude information acquisition unit (attitude acquisition unit, azimuth change acquisition unit) 14, an environment information acquisition unit 15, a high-point acquisition unit (landmark position acquisition unit) 16, a map generation updating unit (map generation unit) 17, a high-point acquisition unit 18, a position azimuth estimation unit (estimation unit) 19, a display data generation unit 20, automatic docking control unit 21, and an interface unit 22.

The control unit 10 is configured as a computer including CPU, ROM and RAM. The ROM stores various programs, etc., including a program for operating the docking assistance device 1. The CPU can read various programs, etc. from the ROM and execute them. In cooperation with the above hardware and software, the control unit 10 can function as the position azimuth information acquisition unit 13, the attitude information acquisition unit 14, the environment information acquisition unit 15, the high-point acquisition unit 16, the map generation updating unit 17, the high-point acquisition unit 18, the position azimuth estimation unit 19, the display data generation unit 20, the automatic docking control unit 21, and the interface unit 22.

The LIDAR 11 can acquire any surrounding environment data indicating the environment around the ship 2. The LIDAR 11 is placed at an appropriate position (for example, bow) of the ship 2. The LIDAR 11 has a light emitting unit and a light receiving unit. The light-emitting unit irradiates pulsed light (laser light) outside the visible spectrum range, and the light receiving unit receives the reflected light that is the pulsed light reflected by the object. Based on the time between the irradiating of the pulsed light and the receiving of the reflected light, the LIDAR 11 detects the presence or absence of an object around the ship 2 and, with the object being present, the distance to the object.

The LIDAR 11 emits and receives the light while (substantially) changing the direction of the pulsed light at a predetermined angular interval. This makes it possible to measure the distance to the object around the ship 2 at every predetermined angle. Such angular scanning may be accomplished, for example, by mechanically adjusting the directions of the light emitting unit and light receiving unit, by a MEMS (micro-electromechanical systems), or by a known phased array method.

Figure 2A:
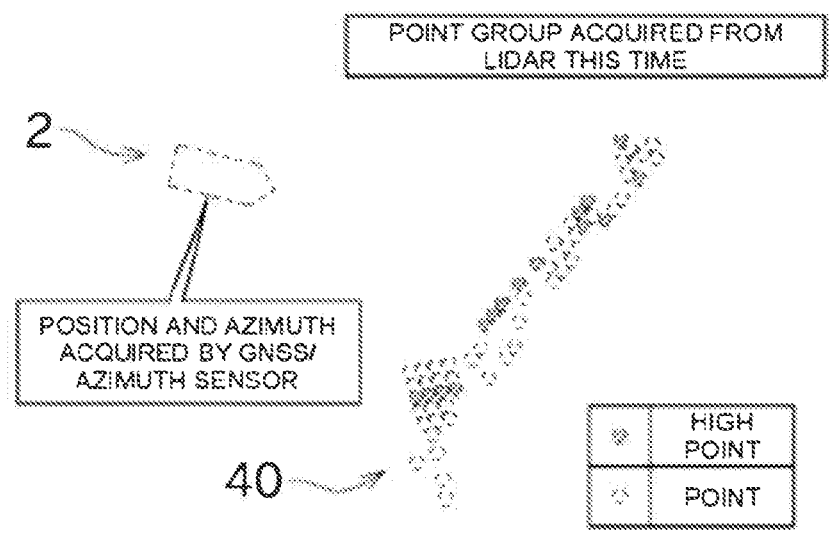
FIG. 2A and FIG. 2B are schematic diagrams illustrating the matching between a high point of a point-group data acquired by a LIDAR and a high point of a map.

In the present embodiment, the LIDAR 11 is configured as a three-dimensional LIDAR that executes the angular scanning in the yaw and pitch directions. This angular scanning allows the LIDAR 11 to output three-dimensional point-group data (surrounding environment data) 40 that represents an object present around the LIDAR 11. FIG. 2A shows an example of the point-group data 40 in the form of a plan view, and the ship 2's position and azimuth acquired by the GNSS device 31 and the azimuth sensor 33.

The camera 12 can generate imaged data by taking pictures of the surrounding of the ship 2, and can output this imaged data. The camera 12 is placed at an appropriate position on the ship 2 (for example, bow). It is preferable that the camera 12 be installed in the vicinity of the LIDAR 11 and in such a manner as to have the shooting direction of the camera 12 coincide with the center of the angular scanning range of the LIDAR 11, since the above installing can easily make the point-group data 40 of the LIDAR 11 correspond to the imaged data of the camera 12.

The position azimuth information acquisition unit 13 can acquire the ship 2's position data acquired by the GNSS device 31 included in the ship 2. Further, the position azimuth information acquisition unit 13 can acquire the ship 2's azimuth data acquired by the azimuth sensor 33 included in the ship 2.

The GNSS device 31 receives GNSS radio wave from a satellite and executes a known positioning calculation, thereby to acquire the ship 2's current position. Therefore, the position data acquirable by the GNSS device 31 is based on the satellite positioning system. In the present embodiment, stand-alone positioning is used as the GNSS positioning, but any known DGNSS positioning and an RTK (Real Time Kinematic) positioning can also be used.

The azimuth sensor 33 can acquire the azimuth of the bow of the ship 2. The azimuth sensor 33 includes a satellite compass in the present embodiment. Since the configuration of the satellite compass is known, any detail thereof is to be omitted, but the satellite compass includes multiple GNSS antennas and can detect the azimuth based on the route difference of carrier wave of GNSS radio wave. Therefore, the azimuth data acquired by the azimuth sensor 33 is based on the satellite positioning system. The azimuth sensor 33 is not limited to this, for example, and can be a magnetic azimuth sensor.

The attitude information acquisition unit 14 can acquire the data (data related to the ship 2's attitude) output by the IMU 35 included in the ship 2. The IMU is an abbreviation of inertial measurement unit.

The IMU 35, which includes an accelerometer, can acquire three-dimensional acceleration. Further, the IMU 35, which includes a gyro sensor, can calculate the three-dimensional angular speed. The above can acquire the ship 2's attitude (roll angle, pitch angle, and yaw angle). The gyro sensor can have various known configurations, such as a ring laser gyro.

The environment information acquisition unit 15 can acquire surrounding environment data (specifically, three-dimensional point-group data 40) acquired by the LIDAR 11. However, since the LIDAR 11 acquires the point-group data 40 in the form of a relative angle and a relative distance to its own device, the position of the point-group data 40 varies depending on the attitude of the ship 2 to which the LIDAR 11 is mounted. Then, from the attitude information acquisition unit 14, the environment information acquisition unit 15 first acquires the ship 2's attitude at the timing when the LIDAR 11 acquires the point-group data 40. Based on this attitude information and on the point group acquired by the LIDAR 11, the environment information acquisition unit 15 calculates the position of the point group in the case where the ship 2 is temporarily at a predetermined angle in the roll and pitch directions (for example, in the case of being horizontal). This converting process can be easily executed by a known geometric calculation. The above can remove any influence, of the ship 2's attitude (roll angle and pitch angle), on the three-dimensional point-group data 40.

The high-point acquisition unit 16 extracts the point, among the three-dimensional point-group data 40 input from the environment information acquisition unit 15, that is positioned higher than a predetermined height. Hereafter, the point extracted with this may be referred to as high point. The fact that an object is placed at a high place can be considered as a type of geographical feature, so the high point can be said to indicate the position of a landmark. A threshold of the height to be extracted as a high point can be appropriately determined, and details thereof will be described below.

Figure 2B:
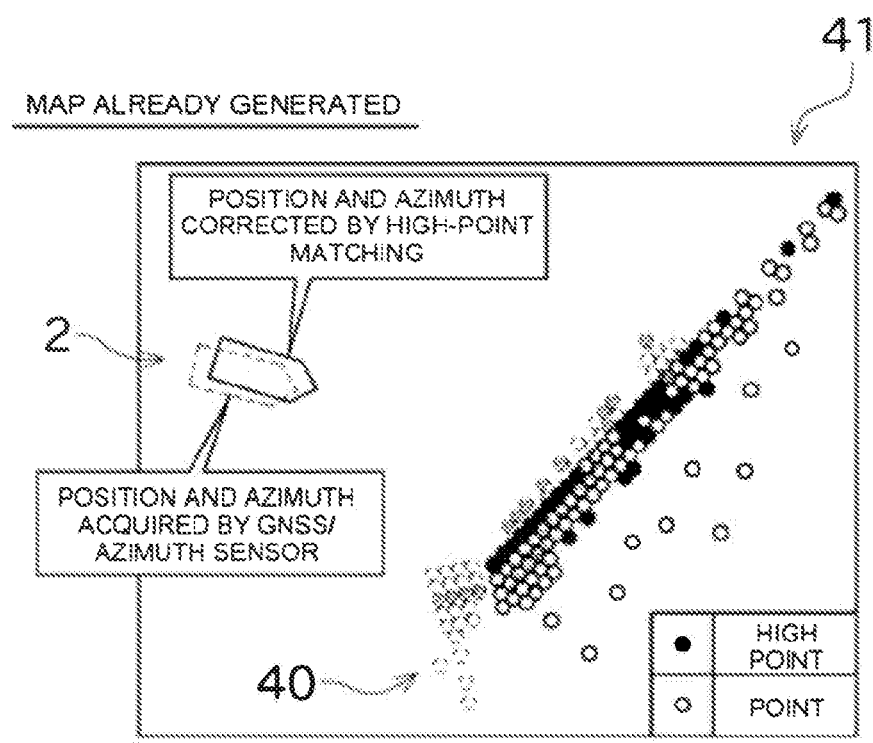

The map generation updating unit 17 generates a map around the ship 2 using the three-dimensional point-group data 40 input from the environment information acquisition unit 15 and the ship 2's position and azimuth input from the position azimuth estimation unit 19. The map can be generated, for example, by plotting the point-group data 40 in a three-dimensional space. FIG. 2B shows an example of the generated map 41. However, in FIG. 2B, the point-group data 40 is drawn in a manner to be superimposed on the map 41 so as to illustrate the below-described matching executed by the position azimuth estimation unit 19.

The ship 2's position and azimuth used as a reference for the map generation updating unit 17 to plot the point-group data 40 on the map 41 include the below-described ship 2's position and azimuth output by the position azimuth estimation unit 19, not the output of the GNSS device 31 and the azimuth sensor 33. This can increase the accuracy of the generated map 41. Details will be described below.

From the map 41 generated by the map generation updating unit 17, the high-point acquisition unit 18 extracts the point that is positioned higher than a predetermined height (high point). It is preferable that the threshold of the height of the high point is equal to the threshold in the high-point acquisition unit 16.

The position azimuth estimation unit 19 estimates the ship 2's position and azimuth by the matching of the high point input from the high-point acquisition unit 16 with the high point input from the high-point acquisition unit 18.

Figure 3:
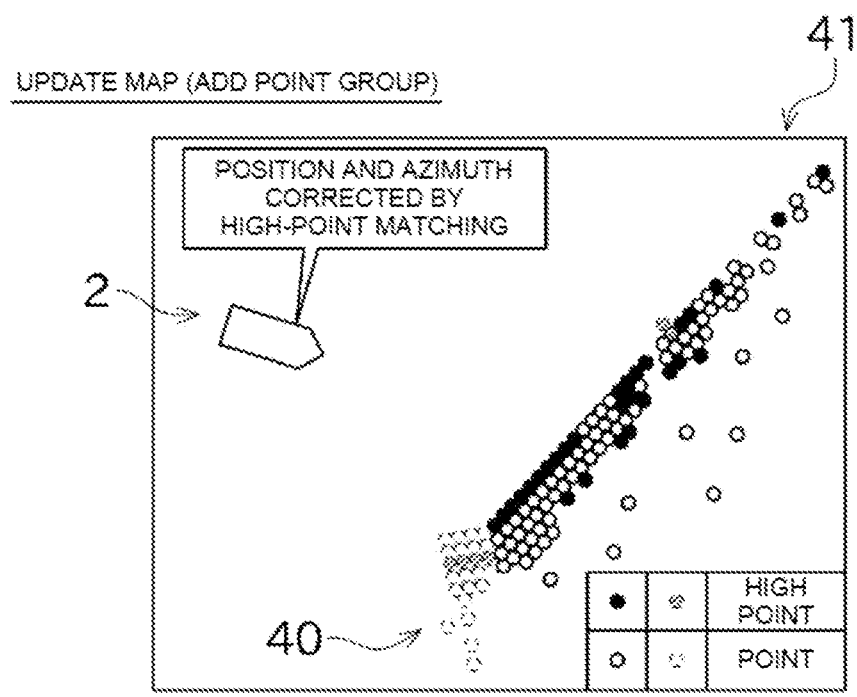
FIG. 3 is a schematic diagram illustrating a process of adding point-group data to the map.

As described above, the ship 2's position and azimuth output by the GNSS device 31 and the azimuth sensor 33 include a certain error. Therefore, if the map 41 should be generated in the form of plotting the point-group data 40 of the LIDAR 11 using the GNSS positioning result as it is, the plot of the point-group data 40 will be misaligned as shown in FIG. 2B, thus degrading the positional accuracy of the point group included in the map 41. In this respect, the position azimuth estimation unit 19 can acquire the accurate position and the ship 2's azimuth by matching the high point stored as the map 41 by the map generation updating unit 17 with the high point that is based on the detection result of the LIDAR 11. Based on the above position and azimuth, the map generation updating unit 17 places the point-group data 40 of the LIDAR, thus making it possible to acquire an accurate map as shown in FIG. 3. With this, a type of SLAM is executed in the present embodiment. SLAM is an abbreviation of Simultaneous Localization AND Mapping.

The method of matching the high points together can be, but is not limited to, a known ICP matching. ICP is an abbreviation of Iterative Closest Point. At the time of calculating the matching; using, as reference information, the ship 2's position and azimuth output by the GNSS device 31 and the azimuth sensor 33 is preferable, because the above using can reduce the calculation amount.

Generally speaking in terms of the matching of the point group, the higher the number of matching points, the higher the accuracy of estimating the position and azimuth. However, in the present embodiment, the target of matching is limited to the high point only.

Figure 4A:
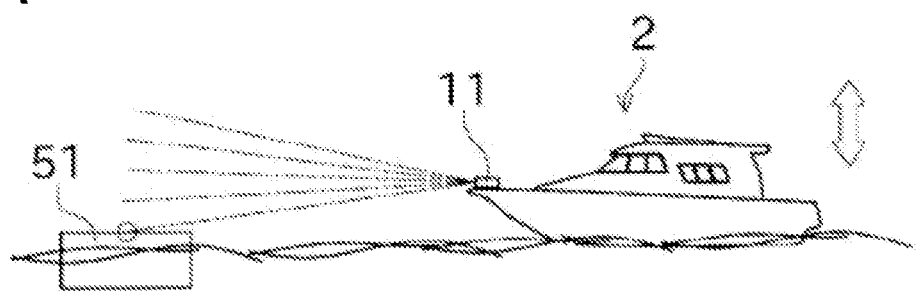
FIG. 4A and FIG. 4B are schematic diagrams illustrating the relation between the LIDAR and a dock.
Figure 4B:
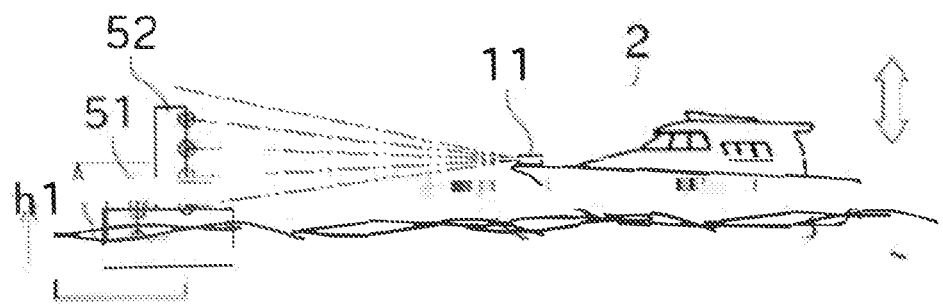

The reason for this is to be described in detail below. For this description, assume a situation where a dock 51 is present near the ship 2, as shown in FIG. 4A or FIG. 4B. In FIG. 4B, a structure having a certain height (specifically, a power supply post 52 for charging the ship 2) is provided protruding upward on the dock 51.

A first reason is instability of detecting the dock 51. The dock 51 is placed close to the water surface; therefore, as shown in FIG. 4A, the dock 51 is often detected near the lower end in the angular scanning range in the pitch direction of the LIDAR 11. Therefore, for example, the ship 2, when swaying (heaving) in the height direction as shown by a white arrow a makes it easier for the dock 51 to move in and out of the angular scanning range of the LIDAR 11. As a result, by the LIDAR 11, sometimes the dock 51 is detected, and at other times the dock 51 is not detected. This instability in detecting the point group leads to a degradation in the accuracy of the ship 2's position and azimuth estimated by the position azimuth estimation unit 19. Meanwhile, since the power supply post 52 has a certain height as shown in FIG. 4B, it is possible to securely perform the detecting with the LIDAR 11, despite the heave of the ship 2.

A second reason is the shape of the dock 51. Most of the docks 51 are each formed in the form of a substantially horizontal floor, close to the water surface. Meanwhile, the LIDAR 11 is mounted to a position at a certain height on the ship 2. Therefore, a laser beam of the LIDAR 11 will most likely hit the floor of dock 51. From the above, it is difficult, when the ship 2 has moved in the horizontal direction in the example of FIG. 4A, to accurately detect the movement of the ship 2, from the change in the position of the point group showing that the dock 51's floor which is a face substantially parallel to the movement direction has been detected. Meanwhile, the power supply post 52 shown in FIG. 4B has many faces that are close to being vertical to the horizontal direction. Therefore, the horizontal movement of the ship 2 can be easily captured as a change in the position of the point group acquired by the LIDAR 11.

In view of these circumstances, the position azimuth estimation unit 19 of the present embodiment excludes, from the matching target, the point group that corresponds to the low structure such as the dock 51, and executes the matching based only on the point group that corresponds to the structure of a certain height or more such as the power supply post 52. This makes it possible to estimate, with high accuracy, the ship 2's position and azimuth. Further, since the number of point groups is reduced by narrowing down the matching targets, reduction in the calculation amount can be accomplished.

Therefore, the threshold of the height extracted as a high point at the high-point acquisition unit 16 and high-point acquisition unit 18 may be set to an appropriate value that is higher than the dock 51's height above water and lower than the power supply post 52, etc.'s height above water. FIG. 4B shows an example of a threshold h1 of height.

The display data generation unit 20 can generate display data to show the ship 2's position, the map 41 around the ship 2, the target docking position, etc. The display data is shown on the display as described below. The display data can be, for example, data for showing the ship 2 at its current position as a symbolic figure, and for showing an obstacle, etc. as a predetermined point figure.

The automatic docking control unit 21 generates a route for the ship 2 to reach the target docking position, and controls the screws 6L, 6R, etc. according to the route, thereby making it possible for the ship 2 to be automatically docked. The ship 2's position and azimuth estimated by the position azimuth estimation unit 19 and the map 41 generated and updated by the map generation updating unit 17 are used for the route generating and the automatic ship maneuver.

The interface unit 22 has a user interface function in the docking assistance device 1. The interface unit 22 can be configured so as to include, for example, a display and an input device. In this case, the user can input an instruction by referring to the content of the display and operating the input device. The input device may be a keyboard, mouse, or touch screen.

Figure 5:
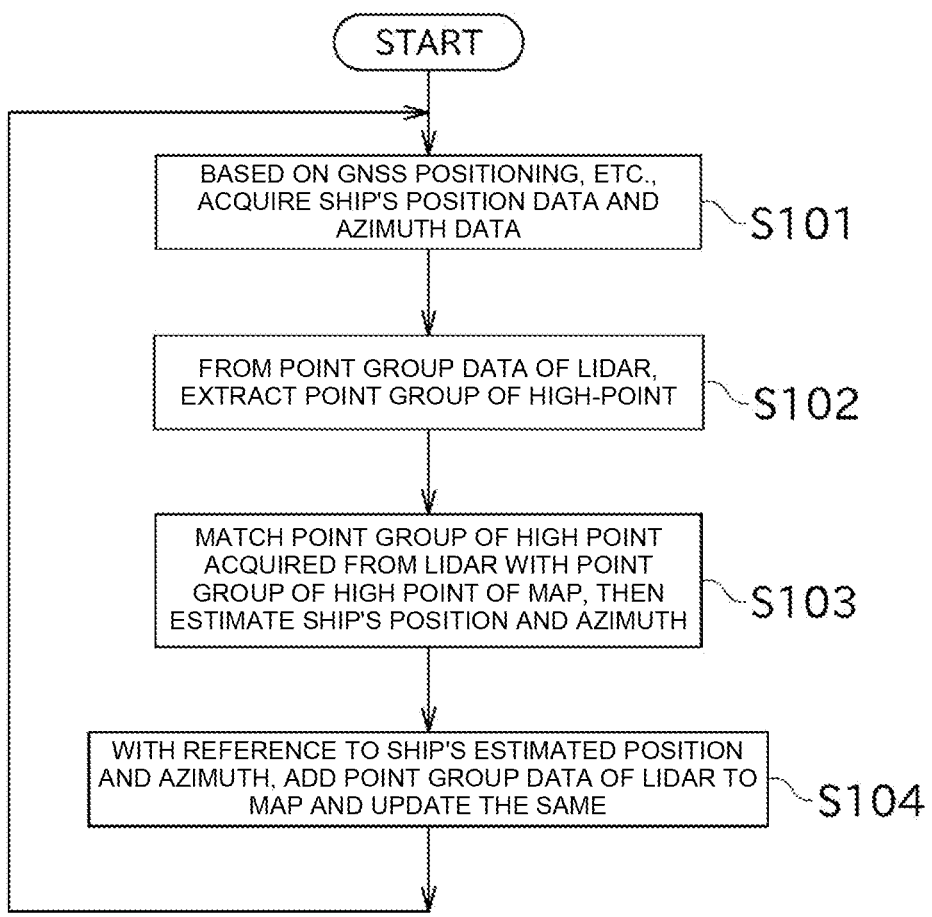
FIG. 5 is a flowchart showing a process of generating and updating the map.

Next, referring to FIG. 5, processes for generating and updating the map 41 will be described in detail. FIG. 5 is a flowchart showing an example of a process flow of the docking assistance device 1.

With the process started, the position azimuth information acquisition unit 13 acquires the ship 2's position data and azimuth data, based on the detection results of the GNSS device 31 and the azimuth sensor 33 (step S101).

Next, from the LIDAR 11's point-group data 40 acquired at the environment information acquisition unit 15, the high-point acquisition unit 16 acquires the point group of only the high point (step S102).

Then, matching the point group of the high point acquired in step S102 with the point group of the high point in the map 41 that has already been generated at the map generation updating unit 17, the position azimuth estimation unit 19 estimates the ship 2's position and azimuth (step S103). The ship 2's position and azimuth acquired in this step S103 are expected to be more accurate than the ship 2's position and azimuth acquired in step S101.

Then, with reference to the ship 2's position and azimuth estimated in step S103, the map generation updating unit 17 updates, in the form of adding to the map 41, the point-group data acquired at the environment information acquisition unit 15 (step S104). The point-group data that is added to the map 41 at this time may or may not be a high point. Then, the process returns to step S101.

Next, description will be made of the point-group data 40 that is processed based on image recognizing by the camera 12.

Any other ship may be navigating or anchored in a harbor. The ship's height based on the water surface is usually higher than the dock. Therefore, the point group showing that the LIDAR 11 has detected the other ship may be recognized as a high point. However, using the other ship as a positional reference for matching is not appropriate, given the possibility of the ship to be moved. Then, in the present embodiment, a known image recognizing is executed on the imaging result of the camera 12 that includes, in the field of view, the angular scanning range of the LIDAR 11, and the point group that is recognized as the other ship is excluded from the high point at the high-point acquisition unit 16. The same is true for the high-point acquisition unit 18. In this way, excluding, from the target of matching (high point), the point that corresponds to the moving object such as a ship can preferably increase the estimation accuracy by the position azimuth estimation unit 19.

Then, description will be made of the point-group data 40 processed based on the distance from the own ship.

For example, when the ship 2 is navigating at a certain speed, the waves caused by the ship 2 may be detected by the LIDAR 11. Excluding, from the target for plotting on the map 41, the point group, among the point-group data 40, that is detected within a predetermined distance from the ship 2 can prevent waves by the own ship's navigating from being falsely detected as an obstacle. Performing the image recognizing with the image of the camera 12 thereby to exclude, from the target for plotting on the map 41, the point group that corresponds to the portion that is recognized to be an object that is not an obstacle (for example, a wave) is allowed.

Then, description will be made of the configuration for inputting, to the position azimuth estimation unit 19, data on the own ship's position and azimuth.

Giving, to the position azimuth estimation unit 19, the ship 2's position acquired by the GNSS device 31 and the ship 2's azimuth acquired by the azimuth sensor 33, as reference information, is not a must. Even without the above information, the matching allows the position azimuth estimation unit 19 to estimate the ship 2's position and azimuth. However, since the matching process converges at an extremely early stage with the information given in advance, it is preferable to input the above reference information in view of the real-time nature, etc. of the map generating.

In some configurations, the cycle to acquire the ship 2's azimuth by the azimuth sensor 33 may be longer than the cycle to acquire the point-group data 40 by the LIDAR 11. Meanwhile, the detecting of azimuth (or, strictly speaking, change in azimuth) by the IMU 35 can be done with a cycle shorter than the detecting of azimuth by the azimuth sensor 33. Using this, the attitude information acquisition unit 14 uses the detection result of the IMU 35 thereby to make it possible to acquire the relative change in azimuth from the time when the azimuth was most recently acquired by the azimuth sensor 33 to the time when the point-group data 40 was acquired by the LIDAR 11. Based on this relative change in azimuth, correcting the azimuth most recently acquired by the azimuth sensor 33 can acquire the ship 2's azimuth at the time of acquiring the point group data 40. Giving this azimuth, as reference information, to the position azimuth estimation unit 19 can accomplish the matching, in a short period, at the position azimuth estimation unit 19.

Next, referring to FIG. 6, detailed description will be made of the process where the high-point acquisition unit 16 extracts, from the point-group data 40, the point group of the high point. FIG. 6 is a flowchart describing the process executed by the high-point acquisition unit 16.

With the process started, the high point acquisition unit 16 focuses on one point included in the point-group data 40, and determines whether the height of this point is equal to a predetermined threshold h1 or more (step S201). When the position of the point is expressed in three-dimensional Cartesian coordinates, this determination can be easily made by examining the z-coordinate.

When the height of the point is the threshold h1 or more, the high-point acquisition unit 16 determines whether or not the point is a point of the portion that has been recognized as the other ship by the image recognizing of the camera 12 (step S202). This determination is for excluding, from the high point, the point that corresponds to the moving object, as described above.

When the point does not correspond to the moving object, the high-point acquisition unit 16 adds the point to the point group of the high point (step S203). When it is determined in step S201 that the height of the point is less than the threshold h1, or when it is determined in step S202 that the point corresponds to the moving object, the process of step S203 is not executed.

The high-point acquisition unit 16 repeats the processes of step S201 to step S203 for all the points that are included in the point-group data 40 (step S204). Then, the process is ended.

As described above, the docking assistance device 1 of the ship 2 of the present embodiment has the position azimuth information acquisition unit 13, the LIDAR 11, the map generation updating unit 17, the high-point acquisition unit 16, and the position azimuth estimation unit 19. The position azimuth information acquisition unit 13 acquires the ship 2's position data that is based on the satellite positioning system. The LIDAR 11 acquires the point-group data 40 that three-dimensionally shows the environment around the ship 2. Based on the point-group data 40, the map generation updating unit 17 generates the map 41 around the ship 2. The high-point acquisition unit 16 acquires the high point among the point-group data 40. The position azimuth estimation unit 19 estimates the ship 2's position and azimuth by matching the high point acquired by the high-point acquisition unit 16 with the high point in the map 41. The map generation updating unit 17 places the point-group data 40 on the map 41 based on the ship 2's position and azimuth estimated by the position azimuth estimation unit 19, thereby to update the map 41.

With this, the point-group data 40 is placed on the map 41 based on the own ship's position and azimuth estimated as a result of matching the point-group data 40 with the map 41, thus making it possible to acquire the map 41 with accuracy higher than when following the satellite positioning system. Further, since the matching is executed by excluding the object with low height, it is possible to prevent the object, that is unstable to detect, such as dock, from degrading the accuracy of estimating the ship's position and azimuth. As a result, the map 41 that is accurate can be acquired, thus making it possible to appropriately perform the docking assistance.

In the docking assistance device 1 of the ship 2 of the present embodiment, the map generation updating unit 17 places the point-group data 40 on the map 41 regardless of a high point or not.

With this, regardless of whether the surrounding object is high or low, use of the map 41 can prevent the ship 2 from contacting the object.

In the docking assistance device 1 of the ship 2 of the present embodiment, the high-point acquisition unit 16 excludes, from the target to be acquired as a high point, the point-group data 40's portion that corresponds to the portion determined to be the moving object by the image recognizing of the imaging result of the camera 12 included in the ship 2.

With this, the accuracy of estimating the ship 2's position and azimuth can be prevented from being degraded by the matching that is based on the moving object (for example, another ship).

In the docking assistance device 1 of the ship 2 of the present embodiment, the map generation updating unit 17 excludes, from the target to be placed on the map 41, the point-group data 40's portion having a distance from the ship 2 closer than the predetermined distance.

This can prevent, for example, waves, which are caused by the movement of the ship 2, from being treated as obstacles.

In the docking assistance device 1 of the ship 2 of the present embodiment, when the position azimuth estimation unit 19 estimates the ship 2's position and azimuth, the ship 2's position data acquired by the position azimuth information acquisition unit 13 is input to the position azimuth estimation unit 19.

This gives, to the position azimuth estimation unit 19, a clue as to the ship 2's position, thus making it possible to estimate the ship's position and azimuth with a small calculation amount and in a short time.

In the docking assistance device 1 of the ship 2 of the present embodiment, the position azimuth information acquisition unit 13 can acquire the azimuth data in addition to the ship 2's position data. When the position azimuth estimation unit 19 estimates the ship 2's position and azimuth, the ship 2's position data and azimuth data acquired by the position azimuth information acquisition unit 13 are input to the position azimuth estimation unit 19.

This gives, to the position azimuth estimation unit 19, the clue as to the ship 2's position and azimuth, thus making it possible to estimate the ship 2's position and azimuth with a small calculation amount and in a short time.

In the docking assistance device 1 of the ship 2 of the present embodiment, the position azimuth information acquisition unit 13 acquires the ship 2's azimuth data that is based on the satellite positioning system. Further, the position azimuth information acquisition unit 13 also functions as an azimuth change acquisition unit that acquires the relative change in the ship 2's azimuth based on the IMU 35. The ship 2's azimuth data acquired by the position azimuth information acquisition unit 13 is corrected based on the result of acquiring, with the azimuth change acquisition unit, the relative change in the ship 2's azimuth from the time of acquiring the azimuth data to the time of acquiring the point group data 40, and thereafter the corrected azimuth data is input to the position azimuth estimation unit 19.

This accomplishes that even when the time interval for the azimuth sensor 33 to acquire the azimuth that is based on the satellite positioning system cannot be shortened, using the IMU 35 thereby to acquire the azimuth change makes it possible to give, in a sufficiently short time interval, to the position azimuth estimation unit 19, the clue as to the ship 2's azimuth.

The docking assistance device 1 of the ship 2 of the present embodiment includes the attitude information acquisition unit 14 capable of acquiring the ship 2's attitude in at least the pitch direction and roll direction. Based on the ship 2's attitude acquired by the attitude information acquisition unit 14, the point group data 40 is corrected so as to remove the influence of the ship 2's attitude.

This can remove the influence caused to the point-group data 40 due to the rocking of the ship 2. As a result, the matching and the point-group data 40's placing can be accurately done, thus making it possible to acquire the map 41 with high accuracy.

The docking assistance device 1 of the ship 2 of the present embodiment includes the automatic docking control unit 21. Based on the map 41 updated by the map generation updating unit 17, the automatic docking control unit 21 executes the automatic docking control of the ship 2.

This allows the automatic docking control to be executed based on the accurate map 41.

While the description has been made of the appropriate embodiment and variations thereof, the above configuration can be modified, for example, as follows.

The process of excluding, from the high point, the point, among the point-group data 40, that is recognized as the moving object can be omitted. The process of excluding, from the plot on the map 41, the point-group data 40's point that is closer from the ship 2 than the predetermined distance can be omitted.

Among the point group plotted on the map 41 in the map generation updating unit 17, only the point group that is not considered to be a high point may be treated as an obstacle by the automatic docking control unit 21.

The map generation updating unit 17 may generate a two-dimensional map instead of the three-dimensional map 41. In other words, the matching of the high point may be done two-dimensionally in the position azimuth estimation unit 19.

The automatic docking control unit 21 may be omitted. Even when the automatic ship maneuvering is not executed, displaying the map 41 on the display of the interface unit 22, for example, can assist the operator in maneuvering the ship for docking. A route from the current position of the own ship to the target docking position may be generated and displayed on the automatic docking control unit 21.

The position for mounting the LIDAR 11 on the ship 2 is optional, and the LIDAR 11 can be mounted on the bow, stern, side of the hull, the upper portion of the cockpit, etc.

The position for mounting the camera 12 on the ship 2 is optional, and the camera 12 can be mounted on the bow, stern, side of the hull, the upper portion of the cockpit, etc.

In the above embodiment, the propulsion unit 5 is configured so as to allow the direction of the rotation axis of each of the screws 6L, 6R to be changed independently. However, the method of the propulsion unit 5 can be modified to any other method as long as being able to substantially accomplish the lateral parallel movement and the in-situ rotation, etc. of the ship 2. For example, it is conceivable that the propulsion unit 5 includes a pair of right and left screws that cannot change the direction of the rotation axis, a rudder, and a side thruster that is provided on the bow side. Further, the propulsion unit 5 can include a single screw that cannot change the direction of the rotation axis, a rudder, and side thrusters provided on the respective bow and stern sides.

In view of the above teachings, it is clear that the present invention can take many modified and variant modes. Therefore, it is to be understood that, within the scope of the appended claims, the present invention may be practiced in ways other than those described herein.

DESCRIPTION OF REFERENCE NUMERALS

1: docking assistance device
2: ship
12: camera
13: position azimuth information acquisition unit (position acquisition unit, azimuth acquisition unit)
16: high-point acquisition unit (landmark position acquisition unit)
17: map generation updating unit (map generation unit)
19: position azimuth estimation unit (estimation unit)
21: automatic docking control unit
40: point-group data (surrounding environment data)

The invention claimed is:

1. A ship docking assistance device, comprising:
a position acquisition unit configured to acquire, based on a satellite positioning system, position data of a ship;
a surrounding environment sensor configured to generate surrounding environment data associated with an environment around the ship in three dimensions;
a map generation unit configured to generate a map associated with an area around the ship based on the position data and the surrounding environment data;
a landmark position acquisition unit configured to:
determine a point in the surrounding environment data that is positioned at a height above the water in which the ship travels that is greater than or equal to a predetermined height; and
acquire a position of the point, wherein the position of the point is indicative of a position of a landmark;
an estimation unit configured to estimate a position of the ship and an azimuth by matching the position of the landmark acquired by the landmark position acquisition unit with a position of the landmark in the map,
wherein the map generation unit is further configured to generate a second map by placing the surrounding environment data on the map based on the position and the azimuth estimated by the estimation unit; and
an automatic docking control unit that controls an engine or motor of the ship to drive a steering component of the ship based on the second map such that the ship is moved into a position to be docked at a dock.

2. The ship docking assistance device according to claim 1, wherein the map generation unit is configured to generate the second map by placing the surrounding environment data on the map independent of whether the surrounding environment data corresponds to the landmark.

3. The ship docking assistance device according to claim 1, wherein the landmark position acquisition unit is configured to exclude, from a target to be acquired as the landmark, a portion of the surrounding environment data that corresponds to a moving object, the moving object recognized based on image recognition performed on an image captured by a camera of the ship.

4. The ship docking assistance device according to claim 1, wherein the map generation unit is configured to exclude, from a target to be placed on the map, a portion of the surrounding environment data having a distance from the ship less than a predetermined distance.

5. The ship docking assistance device according to claim 1, wherein the estimation unit is configured to estimate the position of the ship and the azimuth based on the position data acquired by the position acquisition unit and received by the estimation unit as a first input.

6. The ship docking assistance device according to claim 5, comprising:
an azimuth acquisition unit configured to acquire azimuth data of the ship,
wherein the estimation unit is configured to estimate the position of the ship and the azimuth based on the azimuth data acquired by the azimuth acquisition unit and received by the estimation unit as a second input.

7. The ship docking assistance device according to claim 6, wherein:
the azimuth acquisition unit is configured to acquire the azimuth data of the ship based on the satellite positioning system,
the ship docking assistance device comprises an azimuth change acquisition unit that is configured to acquire a relative change in the azimuth of the ship, and
the azimuth data of the ship acquired by the azimuth acquisition unit is corrected based on a result of acquiring, by the azimuth change acquisition unit, the relative change in the azimuth of the ship from a time of acquiring the azimuth data to a time of acquiring the surrounding environment data, and thereafter the corrected azimuth data is input to the estimation unit.

8. The ship docking assistance device according to claim 1, comprising:
an attitude acquisition unit configured to acquire an attitude of the ship in a pitch direction and a roll direction,
wherein, based on the attitude acquired by the attitude acquisition unit, the surrounding environment data is corrected so as to remove an influence of the attitude of the ship.

9. The ship docking assistance device according to claim 1, wherein the automatic docking control unit is configured to control steering of the ship so as to automatically dock the ship.

10. The ship docking assistance device according to claim 1, wherein the surrounding environment sensor is a ranging sensor and the surrounding environment data is point-group data.

11. A ship docking assistance device, comprising:
a processor; and
a memory storing processor-executable code, which when executed by the processor, causes the processor to perform operations including:
receiving, from a satellite positioning system, position data of a ship;
receiving point-group data representing an area around the ship;
determining a first point of the point-group data that is positioned at a height above the water in which the ship travels that meets a predetermined threshold, wherein the first point is indicative of a position of an object;
determining a first map based on the position data of the ship and the point-group data, wherein the map includes a second point representing the position of the object;
determining a position of the ship and an azimuth of the ship by matching the first point with the second point;
determining a second map based on the first map, the point-group data, and the position of the ship and the azimuth of the ship that are determined; and
controlling steering of the ship based on the second map.

12. The ship docking assistance device according to claim 11, wherein the point-group data is received from a ranging sensor, and wherein the second map is determined by combining the first map and the point-group data independent of whether the point-group data corresponds to the object.

13. The ship docking assistance device according to claim 11, wherein the operations further include determining that the object is a stationary object based on a captured image of the object.

14. A method comprising:
 receiving, from a satellite positioning system, position data of a ship;
 receiving point-group data representing an area around the ship;
 determining a first point of the point-group data that is positioned at a height above the water in which the ship travels that meets a predetermined threshold, wherein the first point is indicative of a position of an object;
 determining a first map based on the position data of the ship, wherein the map includes a second point representing the position of the object;
 determining a position of the ship and an azimuth of the ship by matching the first point with the second point;
 determining a second map based on the first map, the point-group data, and the position of the ship and the azimuth of the ship that are determined; and
 controlling steering of the ship based on the second map.

15. The method of claim 14, wherein the point-group data is received from a ranging sensor, and wherein the second map is determined by combining the first map and the point-group data independent of whether the point-group data corresponds to the object.

16. The method of claim 14, further comprising:
 receiving an image of the object captured by a camera disposed on the ship; and
 determining that the object is a stationary object based on the image.

\* \* \* \* \*